Oct. 1, 1946.    R. A. KIEHL    2,408,651
WORLD GLOBE AND SCALE
Filed Nov. 10, 1944    2 Sheets-Sheet 2
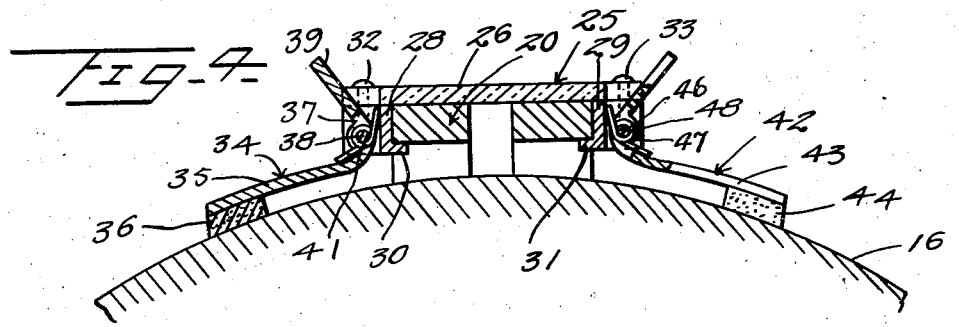
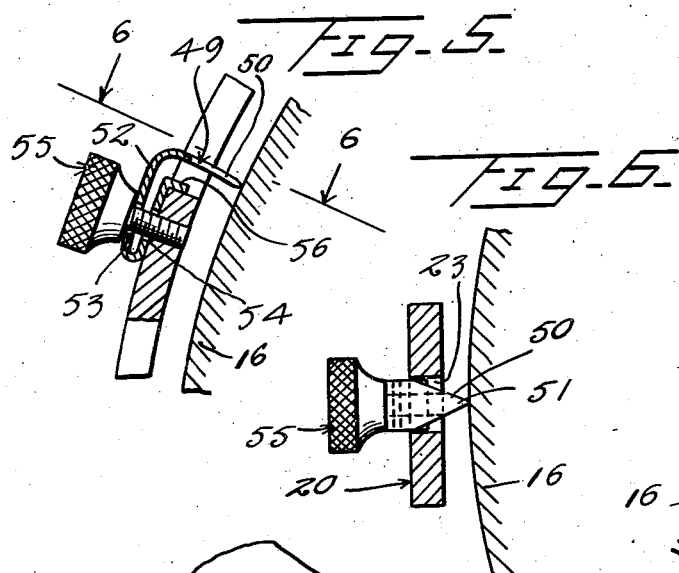
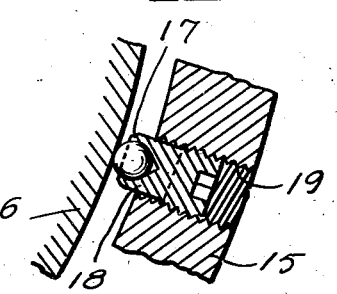
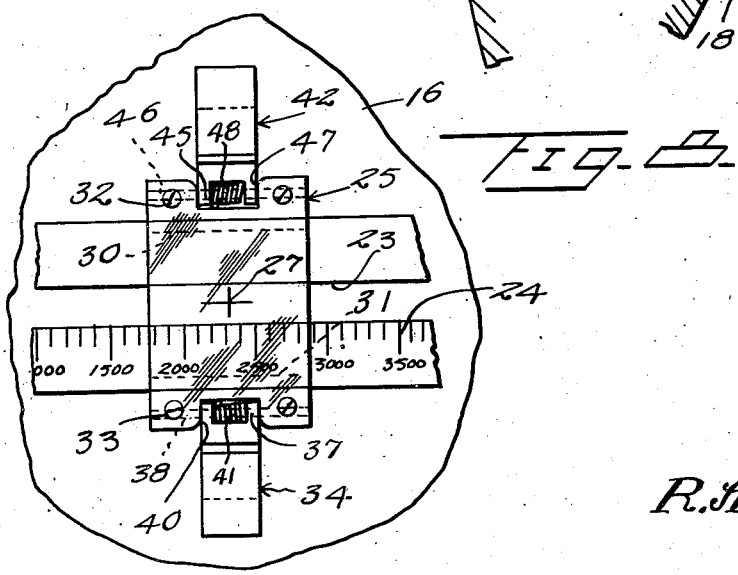
Inventor
R. A. Kiehl
By Kimmel & Crowell
Attorneys Patented Oct. 1, 1946

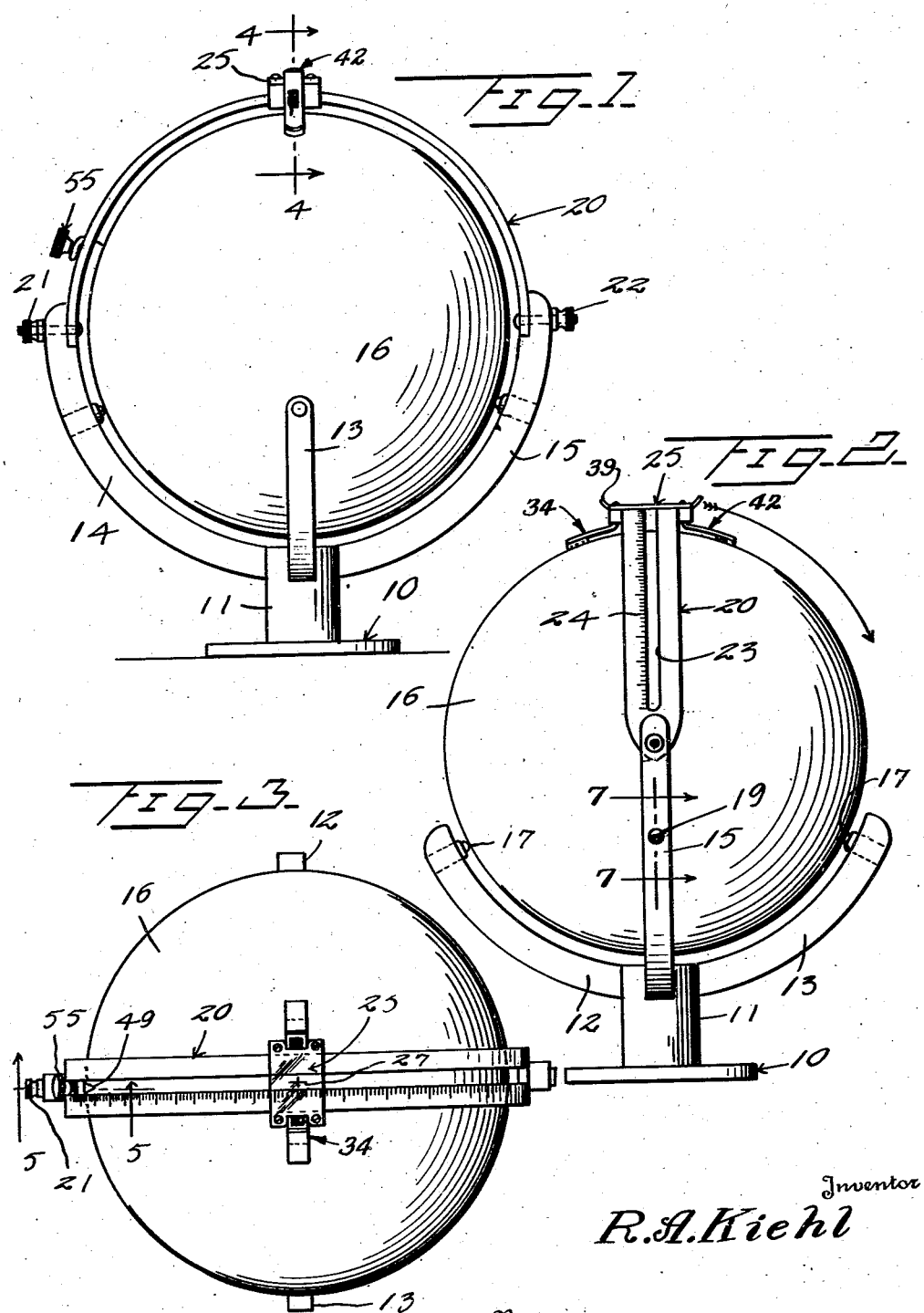

2,408,651

UNITED STATES PATENT OFFICE 2,408,651

WORLD GLOBE AND SCALE

Ralph A. Kiehl, San Diego, Calif.

Application November 10, 1944, Serial No. 562,810

6 Claims. (Cl. 35—46)

This invention relates to world globes and to a means for scaling distances on the globe.

An object of this invention is to provide a globe and support therefor wherein no fixed axis for the globe is provided so that the globe may be turned in any way desired to dispose the desired section of the globe in a position whereby distances may be measured between selected points.

Another object of this invention is to provide a globe structure wherein the globe may be readily removed and replaced without taking the support apart.

A further object of this invention is to provide in a globe structure of this kind an adjustable axis which is correlated with the measuring slide so that the distance between the axis and a selected point may be accurately measured.

A further object of this invention is to provide an improved globe support and means for rotatably supporting the globe.

A further object of this invention is to provide a combined measuring slide and brake so that the globe will be held stationary when the distances are being measured.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail side elevation of a globe and support constructed according to an embodiment of this invention.

Figure 2 is a detail front elevation of the device.

Figure 3 is a top plan of the device.

Figure 4 is a sectional view taken on the line 4—4 of Figure 1.

Figure 5 is a sectional view taken on the line 5—5 of Figure 3.

Figure 6 is a sectional view taken on the line 6—6 of Figure 5.

Figure 7 is a sectional view taken on the line 7—7 of Figure 2.

Figure 8 is a fragmentary plan view of the combined slide and brake on an enlarged scale.

Referring to the drawings, the numeral 10 designates a base which has rising therefrom a standard or support 11. The standard 11 has extending therefrom pairs of upwardly curved globe supporting arms 12, 13, 14 and 15. The arms 12 and 13 are substantially shorter in length than the arms 14 and 15, the purpose for which will be hereinafter described.

A globe 16 is adapted to be seated on the supporting arms 12 to 15, inclusive, and is rotatably supported within the concave sides of the arms on supporting balls 17. There is one ball in each of the supporting arms and each ball is carried by a ball socket 18, which is threaded into an opening 19 in each of the arms at a point below the horizontal center of the globe. The balls 17 in the arms 14 and 15 are positioned at a point downwardly from the upper ends thereof and are in substantially the same horizontal plane as the horizontal plane of balls in arms 12 and 13.

An arcuate guide bar and globe retaining member 20 is pivotally secured on pivot members 21 and 22 which are carried by the upper ends of the arms 14 and 15. The free ends of the guide member 20 are frictionally held on the pivot members 22 so that the guide member 20 will remain in a predetermined position, the normal position of guide 20 being in vertical alignment with arms 14 and 15. Guide member 20 is preferably formed of transparent material and is provided with an elongated slot 23 extending lengthwise thereof, and one edge of the slot 23 is formed with graduations 24 which are graduated in miles, or other predetermined distances, so that distances may be accurately measured on the surface of globe 16.

A combined slide and brake member generally designated as 25 is slidably carried by guide bar 20 and comprises an upper transparent plate 26, which is formed with a crossed hairline indication 27. The plate 26 has secured to the lower side thereof a pair of flange bars 28 and 29, the flanges 30 and 31, respectively, of which are disposed on the lower side of guide member 20. The bars 28 and 29 are secured to plate 26 by means of fastening members 32 and 33, respectively. A spring pressed globe brake member 34 extends laterally from one side of slide 25 and comprises an elongated strip 35 which has secured to the outer end thereof a fibrous braking element 36.

The inner or upper end of strip 35 is formed with a barrel 37 through which a pivot member 38 engages. A handle or operator 39 is formed integral with strip 35 and extends at an acute angle upwardly and outwardly from the inner end of strip 35. Bar 28 and the adjacent end of plate 26 are cut out, as indicated at 40, to provide for receiving the barrel 37 and pivot member 38. A spring 41 engages about pivot member 38 and provides a means whereby brake member 34 is constantly urged to a braking position.

A second braking member 42 extends laterally from the opposite side of slide 25 and comprises an elongated strip 43, having secured to the lower end thereof braking element 44. The inner upper end of the strip 43 is formed with one or more barrels 45 through which a pivot member 46 engages and bar 29 and the adjacent side of plate 26 are cut out, as indicated at 47, to provide for receiving brake member 42. A spring 48 constantly urges brake member 42 to a position with braking element 44 contacting the periphery or outer surface of globe 16.

In order to provide a releasable axis and pointer or indicator which is correlated with slide 25 to measure a distance between two predetermined points on the globe 16, I have provided a resilient combined pointer and axis designated 49. The combined pointer and axis 49 includes a V-shaped pointer 50 which is formed with a rounded point 51 adapted to engage the outer surface of the globe 16. Pointer 50 is carried by a U-shaped resilient member 52, having openings 53 and 54 in the parallel legs thereof through which a threaded clamping screw 55 is adapted to engage. The inner leg of the U-shaped member 52 is formed with a right angular flange 56 adapted to engage against the end of slot 23, as shown in Figure 5. Pointer 50 loosely engages through slot 23 and when in released position, pointer 50 is out of engagement with the surface of globe 16.

In the use and operation of this device, pointer 49 is initially disposed out of engagement with the surface of globe 16, so that globe 16 may be freely rotated on the supporting balls 17. As there is no fixed axis for globe 16, this globe may be turned in any desired direction. In order to measure the distance between two given points on the surface of globe 16, the globe is turned until one of the given points is beneath the stationary pointer 49. Set screw 55 is then turned inwardly to provide for contact of the rounded point 51 with the surface of the globe at one of the two points to be measured. The globe may then be rotated with point 51 as an axis, and when the second point on the globe is within slot 23, slide 25 is shifted until hairline 27 is over the second measured point. The numerals on the graduations 24 will then indicate the correct distance in miles or the like between the two designated points on the globe.

When hairline 27 is over the second of the points to be measured, brakes 34 and 42 which are raised by pressing the handles 39 inwardly, are released for engagement with the surface of the globe so that the globe will then be held stationary. In the event it is desired to remove globe 16 from the supporting frame structure, guide 20 may be swung downwardly in either direction, and when guide 20 is in either a horizontal position or a position below the horizontal globe 16 may be easily lifted from the supporting frame structure. By providing a releasable axis for the globe and a round point for this axis, the surface of the globe will not be injured when point 51 is in contact with the globe.

While the guide bar and retaining member 20 is shown as having indicia and graduations thereon indicating distances, this member may also be calibrated in time periods between selected points, and cost rates for air travel, air mail, air express and the like.

What I claim is:

1. A globe and support therefor comprising a base, a standard rising from said base, radially arranged upwardly directed arcuate arms carried by said base, a globe rotatably seated in the concave sides of said arms and having universal movement, a substantially semi-circular combined globe retainer and guide bar rockably carried by an opposed pair of said arms, a slide member slidably carried by said bar, and spring-pressed brake means carried by said bar for holding said globe against rotation.

2. A globe and support therefor comprising a base, a plurality of upwardly directed arcuate arms carried by said base, a globe rotatably carried by said arms and having universal movement, a substantially semi-circular combined globe retainer and guide bar rockably carried by an opposed pair of said arms, means releasably locking said bar in alignment with said opposed pair of arms, a slide member slidably carried by said bar, spring pressed brake means carried by said slide member engageable with said globe for holding said globe against rotation, a resilient axis member carried by said bar normally disengaged from said globe, and adjustable means for moving said axis member into contact with said globe.

3. A globe and support therefor as set forth in claim 2 wherein said arms include rotatable balls engageable with said globe for rotatably supporting the latter whereby said globe may be universally rotated.

4. A globe and support therefor as set forth in claim 2 wherein said bar is formed with graduations on the outer side thereof and said slide is formed with a hairline indication.

5. A globe and support therefor as set forth in claim 2 wherein said bar is formed with graduations, and said axis member is correlated with said graduations whereby the distance between the point on the globe contacted by said axis and a second point determined by said slide may be accurately measured.

6. A globe and support therefor as set forth in claim 2 wherein said spring-pressed brake means extends laterally from opposite sides of said slide.

RALPH A. KIEHL.